(No Model.)

R. McDONALD & C. FRASER.
BAKING OVEN.

No. 319,003. Patented June 2, 1885.

WITNESSES
C. W. Dashiell
E. G. Siggers

INVENTOR
R. McDonald
Cameron Fraser
By their Attorneys
C. A. Snow & Co.

UNITED STATES PATENT OFFICE.

RONALD McDONALD AND CAMERON FRASER, OF PORT HAWKESBURY, NOVA SCOTIA, CANADA.

BAKING-OVEN.

SPECIFICATION forming part of Letters Patent No. 319,003, dated June 2, 1885.

Application filed March 10, 1885. (No model.)

*To all whom it may concern:*

Be it known that we, RONALD McDONALD and CAMERON FRASER, citizens of the Dominion of Canada, residing at Port Hawkesbury, in the Island of Cape Breton and Province of Nova Scotia, have invented new and useful Improvements in Baking-Ovens, of which the following is a specification, reference being had to the accompanying drawings.

Our invention relates to an improvement in baking-ovens, designed to be set upon the top of a stove when in use; and it consists in the peculiar construction and arrangement of parts, that will be more fully set forth hereinafter.

Figure 1:
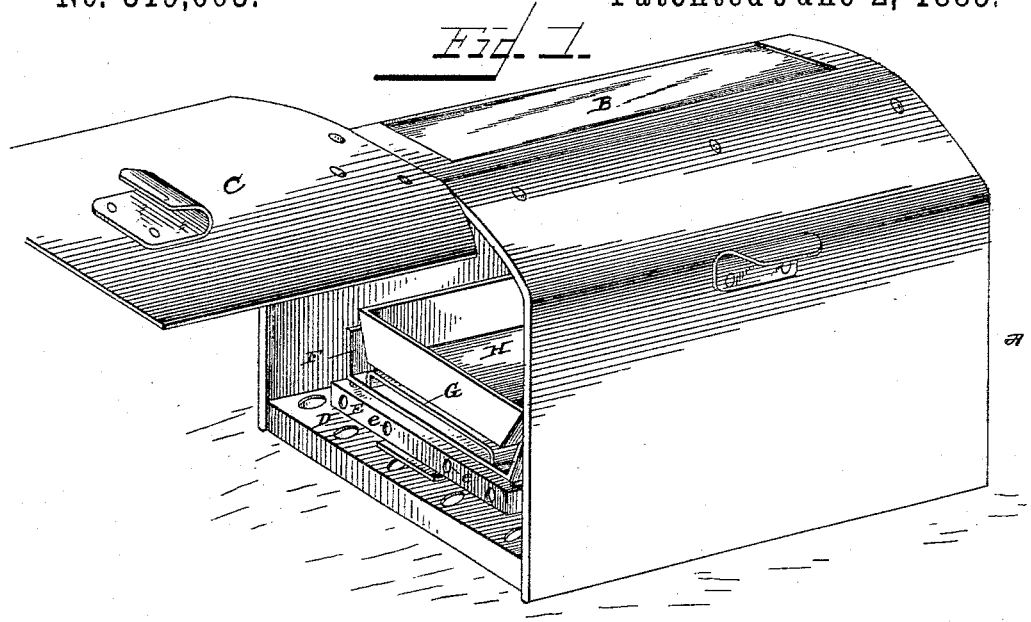
Figure 2:
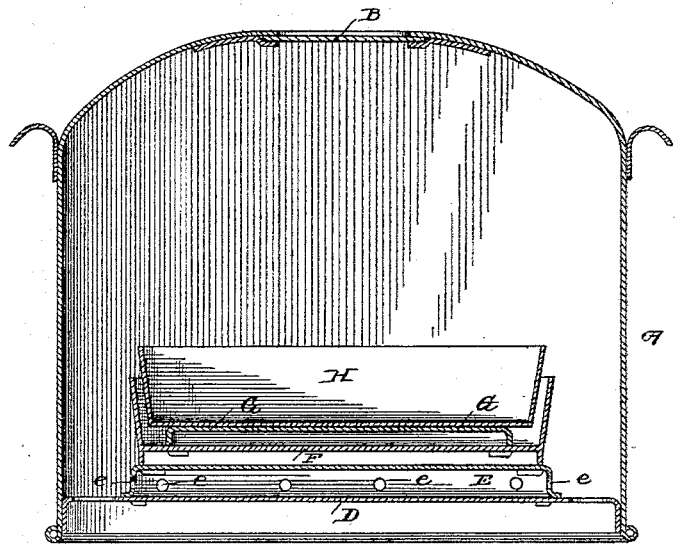

In the accompanying drawings, Figure 1 is a perspective view of an oven embodying our invention, showing the door partly open. Fig. 2 is a vertical transverse sectional view of the same.

A represents a rectangular box or case that is made of sheet metal, and has a curved top, in which is made an opening that is covered with a glass pane, B.

A door, C, is hinged to one end of the oven, and it is also provided with a perforated bottom, D, which is raised a slight distance above the lower edges of the walls of the oven.

Above the bottom D, and at a slight distance therefrom, is a plate, E, the side and end walls of which are perforated, as at e.

A tray, F, is supported a slight distance above the plate D, and at a slight distance above the bottom of the tray is supported a false bottom or plate, G.

H represents the baking-pan, in which the bread, cake, or meat is placed, and the pan is placed on the false bottom of the tray, and the oven is placed upon the top of the stove.

The heat from the stove rises through the perforated bottom and circulates under and over the baking-pan and bakes the contents in a very short time.

The glass pane in the top of the oven enables the cook to see at a glance the progress of the baking, and thus avoids the necessity of opening the door.

An oven thus constructed is cheap and simple, is adapted to be used in connection with ordinary stoves, and is thoroughly practical and efficient in operation.

Having thus described our invention, we claim—

1. The oven having the perforated bottom, the deflecting-plate E, supported horizontally above the bottom, and the tray F, supported horizontally above the plate E, substantially as described.

2. The oven having the perforated bottom, the deflecting-plate E, supported horizontally above the bottom, and the tray F, supported horizontally above the plate E, said tray having the false bottom G, substantially as described.

In testimony that we claim the foregoing as our own we have hereto affixed our signatures in presence of two witnesses.

RONALD McDONALD.
CAMERON FRASER.

Witnesses:
A. BAIN,
C. W. DASHIELL.